(12) United States Patent
Ryu et al.

(10) Patent No.: US 7,590,421 B2
(45) Date of Patent: Sep. 15, 2009

(54) SUPPORTING IDLE MODE OF MOBILE STATION IN WIRELESS ACCESS SYSTEM

(75) Inventors: Ki Seon Ryu, Seoul (KR); Beum Joon Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 407 days.

(21) Appl. No.: 11/146,767

(22) Filed: Jun. 6, 2005

(65) Prior Publication Data

US 2006/0014550 A1    Jan. 19, 2006

(30) Foreign Application Priority Data

Jun. 7, 2004 (KR) ............... 10-2004-0041539
Feb. 19, 2005 (KR) ............... 10-2005-0013912
Mar. 8, 2005 (KR) ............... 10-2005-0019258

(51) Int. Cl.
*H04B 1/16* (2006.01)

(52) U.S. Cl. .............. 455/436; 455/432.1; 455/443; 455/435.1; 370/331; 370/338; 370/335

(58) Field of Classification Search .......... 455/458, 455/436, 432.1, 435.1, 443; 370/331, 338, 370/335

See application file for complete search history.

(56) References Cited

U.S. PATENT DOCUMENTS 5,588,043 A * 12/1996 Tiedemann et al. ....... 455/435.1
6,138,034 A * 10/2000 Willey ..................... 455/522
6,490,455 B1 * 12/2002 Park et al. ................ 455/456.4

(Continued)

FOREIGN PATENT DOCUMENTS

EP    1 376 972 A2    1/2004

(Continued)

OTHER PUBLICATIONS

Barber, P. et al. "MSS Idle Mode", IEEE 802.16 Broadban Wireless Access Working Group, IEEE C802.16e04/42r7, [online], Mar. 18, 2004 [retrieved on Oct. 13, 2006]. Retrieved from the Internet: , URL:http://www.ieee802.org/16/tge/contrib./c80216e04_42r7. pdf.. pp. 2-11.

(Continued)

*Primary Examiner*—Charles N Appiah
*Assistant Examiner*—Kwasi Karikari
(74) *Attorney, Agent, or Firm*—Lee, Hong, Degerman, Kang & Waimey

(57) ABSTRACT

A method of supporting a mobile station that is in an idle mode in a wireless communication system using a paging controller comprises entering an idle mode by a mobile station, receiving a paging command from a base station in the same paging group, the paging command comprising a paging command action code associated with performing ranging while the mobile station is in the idle mode to verify availability of the mobile station with respect to at least one of the base stations in the paging group, wherein the paging command is generated from the base station in response to a paging announcement from the paging controller, and exiting the idle mode and establishing communication with one of the plurality of base stations, wherein the plurality of base stations in the same paging group receive an idle mode exist status from the paging controller.

11 Claims, 7 Drawing Sheets

U.S. PATENT DOCUMENTS

| | | | |
|---|---|---|---|
| 6,950,415 B2* | 9/2005 | Chang et al. | 370/331 |
| 7,110,377 B2* | 9/2006 | Hsu et al. | 370/331 |
| 7,139,829 B2* | 11/2006 | Wenzel et al. | 709/232 |
| 7,212,831 B2* | 5/2007 | Lee | 455/458 |
| 7,215,956 B2* | 5/2007 | Liu et al. | 455/434 |
| 7,283,495 B2* | 10/2007 | Lee et al. | 370/331 |
| 7,359,353 B2* | 4/2008 | Sayeedi | 370/331 |
| 2002/0041576 A1* | 4/2002 | Chang et al. | 370/331 |
| 2002/0075823 A1* | 6/2002 | Lee et al. | 370/328 |
| 2002/0142784 A1* | 10/2002 | Abrishamkar et al. | 455/458 |
| 2003/0134640 A1* | 7/2003 | Kim et al. | 455/438 |
| 2003/0225887 A1* | 12/2003 | Purnadi et al. | 709/227 |
| 2004/0043767 A1* | 3/2004 | Tsutsumi et al. | 455/432.1 |
| 2004/0071112 A1* | 4/2004 | Hsu et al. | 370/331 |
| 2004/0071113 A1* | 4/2004 | Tiedemann, Jr. | 370/331 |
| 2004/0198353 A1* | 10/2004 | Quick, Jr. | 455/435.1 |
| 2004/0203770 A1* | 10/2004 | Chen et al. | 455/435.1 |
| 2005/0009548 A1* | 1/2005 | Kelley et al. | 455/509 |
| 2005/0094601 A1* | 5/2005 | Hsu et al. | 370/331 |
| 2005/0195787 A1* | 9/2005 | Madour et al. | 370/338 |
| 2005/0226154 A1* | 10/2005 | Julka et al. | 370/235 |
| 2005/0237977 A1* | 10/2005 | Sayeedi | 370/331 |

FOREIGN PATENT DOCUMENTS

| | | |
|---|---|---|
| WO | WO 01/97549 A1 | 12/2001 |
| WO | WO 02/063912 A1 | 8/2002 |

OTHER PUBLICATIONS

Son, J., et al., "Location Management for supporting IDLE mode in IEEE P802.16e," IEEE 802.16 Broadband Wireless Access Working Group, IEEE C80216e-04/66r1, May 17, 2004.

* cited by examiner

SUPPORTING IDLE MODE OF MOBILE STATION IN WIRELESS ACCESS SYSTEM

CROSS-REFERENCE TO RELATED APPLICATIONS

Pursuant to 35 U.S.C. § 119(a), this application claims the benefit of earlier filing date and right of priority to Korean Application No. 10-2004-0041539, filed on Jun. 7, 2004, Korean Application No. 10-2005-0013912, filed on Feb. 19, 2005, and Korean Application No. 10-2005-0019258, filed on Mar. 8, 2005 the contents of which are hereby incorporated by reference herein in their entirety.

FIELD OF THE INVENTION

The present invention relates generally to a wireless access system and, more particularly, to idle mode of a mobile station in a wireless access system.

BACKGROUND OF THE INVENTION

Broadband wireless access systems typically support an idle-mode to minimize the power consumption of a mobile subscriber station (MSS). During the idle-mode, the MSS does not perform a handover procedure when moving between base stations in the same paging zone. Therefore, the MSS does not need to transmit uplink information for the handover procedure, which reduces corresponding power consumption.

A paging zone is defined as a zone that is controlled by a plurality of base stations called a paging group. Each of the base stations in the paging group has the same paging cycle (Paging_Cycle) and the same paging offset (Paging_Offset).

The MSS may make a request to a base station to switch to the idle-mode. The base station then provides a paging message including its paging-group ID, a corresponding paging cycle, and a corresponding paging offset. The corresponding MSS may thus be switched to the idle-mode. During the idle-mode, the MSS may determine whether to continue or terminate the idle-mode based on the paging message provided by the base station at each paging cycle.

If traffic needs to be transmitted by the MSS while in the idle-mode, the MSS may terminate the idle-mode. For example, the MSS may be enabled to terminate the idle-mode by the BS. Furthermore, if the MSS moves to another paging zone or loses its sync while in an idle-mode and is unable to receive a paging at a predefined time, the MSS may terminate the idle-mode.

When the MSS is in the idle-mode, the MSS normally receives a periodic paging to secure its free move in the same paging zone without performing the handover procedure.

In configuring a paging zone, a backbone message (paging-group-action), is transferred by wire between base stations. An exemplary paging-group-action backbone message is shown in Table 1.

TABLE 1

| Field | Size | Notes |
| --- | --- | --- |
| Message Type | 8 bits | |
| Sender BS ID | 48 bits | Base station unique identifier (Same number as that broadcasted on the DL-MAP message) |
| Target BS ID | 48 bits | Base station unique identifier (Same number as that broadcasted on the DL-MAP message) |

TABLE 1-continued

| Field | Size | Notes |
| --- | --- | --- |
| Time Stamp | 32 bits | Number of milliseconds since midnight GMT (set to 0xTTTTTTTT to ignore) |
| Action | 4 bits | 0 - Assign target BS to paging groups<br>1 - Remove target BS from paging groups<br>2 - Query (which paging groups target BS belong to?)<br>3 - Information (Paging groups sender BS belongs to) |
| Num Records | 4 bits | Number of paging-group-ID records |
| For(j=0; j<Num Records; j++) { | | |
| Paging-group_ID | 16 bits | Paging group ID |
| PAGING_CYCLE | 16 bits | Cycle in which the paging message is transmitted within the paging group |
| PAGING OFFSET | 8 bits | MSS PAGING OFFSET parameter |
| } | | |
| Security field | TBD | A means to authenticate this message |
| CRC field | 32 bits | IEEE CRC-32 |

The paging-group-action backbone message is communicated between base stations. The paging-group-action backbone message may be used for four purposes based on contents of an action field (Action). A receiving base station (target BS) may be assigned (designated) to a specific paging group (Action=0). Alternatively, the target BS may be excluded from the specific paging group (Action=1). Alternatively, the target BS may be queried regarding the paging group to which the target BS belongs (Action=2). Alternatively, the target BS may be informed of the paging group to which a transmitting base station (sender BS) belongs (Action=3).

Since a single base station may belong to one or more paging zones, the paging-group-action backbone message may contain information pertaining to a multitude of paging groups. The base stations may be informed of the paging cycle and offset used in each paging zone via the paging-group-action backbone message. Furthermore, the base stations may be dynamically assigned to the paging groups via the paging-group-action backbone message.

In switching an MSS to an idle mode, a DREG_REQ message (one of previous MAC messages) is used. A format of the DREG_REQ message is shown in Table 2.

TABLE 2

| Syntax | Size | Notes |
| --- | --- | --- |
| DREG-REQ_Message_Format( ) { | | |
| Management Message Type = 29 | 8 bits | |
| De-registration Request Code | 8 bits | 0x00 = SS de-registration request from BS and network<br>0x01 = request for MSS deregistration from Serving BS and invitation of MSS paging Availability mode<br>0x02-0xFF = reserved |
| Paging Cycle request | 16 bits | Only valid if De-registration Request Code = 0x01 |
| TLV encoded parameters | Variable | |
| } | | |

An MSS may send a request to a serving base station that the MSS will be switched to idle mode by setting a De-registration Request Code of the DREG_REQ message to 0x01 and then delivering the DREG_REQ message to the base station. This enables delivery of a specific paging cycle.

The serving base station receives the DREG_REQ message and may respond to the request by the MSS via a conventional DREG_CMD message. A format of the DREG_CMD message is shown in Table 3.

TABLE 3

| Syntax | Size | Notes |
| --- | --- | --- |
| DREG-CMD_Message_Format( ) { | | |
| Management Message Type = 29 | 8 bits | |
| Action code | 8 bits | |
| TLV encoded parameters | Variable | |
| } | | |

The serving base station may allow the switching to the idle mode via an action code (Action code=0x05). Alternatively, the serving base station may allow the MSS to make the request for the switching to the idle mode after a time duration (Action code=0x06). Alternatively, the serving base station may not allow the MSS to make the request for the switching to the idle mode until the serving base station transmits the DREG_CMD message (Action code=0x07).

Details of the action code of the DREG_CMD message are shown in Table 4.

TABLE 4

| Action Code | Action |
| --- | --- |
| 0x00 | SS shall leave the current channel and attempt to access another channel |
| 0x01 | SS shall listen to the current channel but shall not transmit until an RES_CMD message or DREG_CMD with Action Code 0x00 is received. |
| 0x02 | SS shall listen to the current channel but only transmit on the Basic, Primary Management, and Secondary Management Connections. |
| 0x03 | SS shall return to normal operations and may transmit on any of its active connections. |
| 0x04 | SS shall terminate current Normal Operations with the BS: the BS shall transmit this action code only in response to any SS DREG_REQ. |
| 0x05 | Require MSS de-registration from Serving BS and request initiation of MSS idle mode. |
| 0x06 | The MSS may retransmit the DREG_REQ message after the time duration (REQ-duration) given by. |
| 0x07 | The MSS shall not retransmit the DREG_REQ message and shall wait the DREG-CMD message. |
| 0x08-0xFF | Reserved |

Base stations belonging to the same paging zone may be able to share the information pertaining to the MSS switched to the idle mode. Using this information, the serving BS may notify the MSS of procedures to execute in each paging cycle.

A Paging-announce backbone message is shown in Table 5.

TABLE 5

| Field | Size | Notes |
| --- | --- | --- |
| Message Type | 8 bits | |
| Sender BS ID | 48 bits | Base station unique identifier (Same number as that broadcasted on the DL-MAP message) |
| Target BS ID | 48 bits | Set to 0xffffff to ignore |
| Time Stamp | 32 bits | Number of milliseconds since midnight GMT (set to 0xffffffff to ignore) |

TABLE 5-continued

| Field | Size | Notes |
| --- | --- | --- |
| Num MSS | 8 bits | Number of MSSs to page |
| For(j=0; j<Num MSS; j++) { | | |
| MSS MAC address | 48 bits | |
| PAGING_CYCLE | 16 bits | MSS PAGING CYCLE parameter |
| PAGING OFFSET | 8 bits | MSS PAGING OFFSET parameter |
| } | | |
| Security field | TBD | A means to authenticate this message |
| CRC field | 32 bits | IEEE CRC-32 |

The paging-announce backbone message may be delivered to all base stations belonging to the same paging zone. The base stations receiving the paging-announce backbone message perform the paging by matching MAC addresses of MSSs included in the message with the paging cycle and offset within the message.

Consequently, due to the paging-announce backbone message, all of the base stations belonging to a specific paging zone may identically maintain MAC addresses of MSSs to page. Thus, a specific MSS may receive its paging information at each paging cycle unless the MSS leaves (deviates from) a current paging zone.

A format of a paging message MOB_PAG_ADV transmitted to MSSs in the idle mode via paging by each base station is shown in Table 6. The paging message is delivered to MSSs in a broadcast format.

TABLE 6

| Field | Size | Notes |
| --- | --- | --- |
| MOB_PAG-ADV_Message_Format( ) { | | |
| Management Message Type=?? | 8 bits | |
| Num_Paging Group IDs | 8 bits | Number of Paging Group Ids in this message |
| For(i=0; i<Num_Paging_Group_IDs; I) { | | |
| Paging Group ID | 8 bits | |
| } | | |
| For(j=0; j<Num_MACs; j++) { | | Number of MSS MAC Addresses in message may be determined from the length of the message (found in the generic MAC header). |
| MSS MAC address hash | 24 bits | The hash is obtained by computing a CRC24 on the MSS 48-bit MAC address. The polynomial for the calculation is 0x864CFB. |
| Action Code | 2 bits | Paging action instruction to MSS 00 = No Action Required 01 = Perform Ranging to establish location and acknowledge message 10 = Enter Network 11 = Reserved |
| Reserved | 6 bits | |
| } | | |
| } | | |

The MSS receives the paging message and may decide whether to maintain the idle mode continuously (Action Code=00), whether to perform ranging to establish a location information update (Action Code=01), and/or whether to terminate the idle mode to receive downlink traffic (Action Code=10).

The MSS may terminate the idle mode if the MSS needs to transmit traffic (uplink traffic occurrence). The MSS also may terminate the idle mode if the MSS needs to receive traffic (downlink traffic occurrence). The MSS also may terminate the idle mode if the MSS is unable to receive a periodic paging due to deviation from a current paging zone or due to a transmission problem.

SUMMARY OF THE INVENTION

The present invention is directed to supporting an idle mode of a mobile station in a wireless access system that substantially obviates one or more problems of the related art.

An object of the present invention is to provide supporting an idle mode of a mobile subscriber station (MSS) in a broadband wireless access system, in which actions taken by MSSs in the idle mode to minimize power consumption of the wireless access system are indicated and by which an accurate operation of the idle mode may be secured.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, in one embodiment, a method of supporting a mobile station that is in an idle mode in a wireless communication system using a paging controller comprises entering an idle mode by a mobile station. The method also comprises receiving a paging command from at least one of the plurality of base stations in the same paging group, the paging command comprising a paging command action code associated with performing ranging while the mobile station is in the idle mode to verify availability of the mobile station with respect to at least one of the base stations in the paging group, wherein the paging command is generated from the at least one of the plurality of base stations in response to a paging announcement from the paging controller. The method also comprises exiting the idle mode and establishing communication with one of the plurality of base stations, wherein the plurality of base stations in the same paging group receive an idle mode exist status from the paging controller.

The paging announcement may preferably be generated from the paging controller when there is downlink traffic data to be delivered to the mobile station. Alternatively, the paging announcement may preferably be generated from the paging controller when there is uplink traffic data from the mobile station. The idle mode response command may preferably comprise at least one of the paging identifier, a paging cycle and a paging cycle offset. The step of exiting the idle mode and establishing communication may preferably further comprise transmitting a ranging request to one of the plurality of base stations with which the mobile station is associated and receiving a ranging response from the one of the plurality of base stations.

The paging announcement may preferably comprise a paging announcement action code comprising at least one of (1) add the mobile station to a paging list; (2) remove the mobile station from the paging list; (3) perform ranging to establish location; and (4) enter network. The paging command action code may preferably comprise at least one of (1) enter network; and (2) perform ranging to establish location.

The step of entering the idle mode may preferably further comprise requesting to a serving base station by a mobile station to enter an idle mode, wherein the serving base station is associated with a paging controller, the paging controller controlling a plurality of base stations associated with a paging group. The step of entering the idle mode may also preferably further comprise receiving from the serving base station an idle mode response command to enter the idle mode.

The paging controller may preferably be identified with a paging controller identifier and the mobile station is identified with a medium access controller (MAC) identifier. The paging command may preferably comprise information identifying the mobile station by using the MAC identifier. The paging announcement may preferably comprise information identifying the mobile station by using the MAC identifier. The step of entering the idle mode by the mobile station may preferably further comprise the paging controller informing an idle mode entering status of the mobile station to the plurality of base stations in the paging group.

In another embodiment, a method of supporting an idle mode by a network in a wireless communication system using a paging controller comprises receiving a request from a mobile station to a serving base station to enter an idle mode, wherein the serving base station is associated with a paging controller, the paging controller controlling a plurality of base stations associated with a paging group. The method also comprises transmitting from the serving base station to the mobile station an idle mode response command to enter the idle mode. The method also comprises transmitting a paging command from at least one of the plurality of base stations in the same paging group, the paging command comprising a paging command action code associated with performing ranging while the mobile station is in the idle mode to verify availability of the mobile station with respect to at least one of the base stations in the paging group, wherein the paging command is generated from the at least one of the plurality of base stations in response to a paging announcement from the paging controller. The method also comprises establishing communication between one of the plurality of base stations and the mobile station. The method also comprises transmitting an idle mode exist status from the paging controller to the plurality of base stations in the same paging group.

The method may also preferably comprise transmitting from the serving base station to the paging controller an idle mode information request message to provide information pertaining to the mobile station. The method may also preferably comprise receiving in the paging controller the idle mode information request message from the serving base station. The method may also preferably comprise transmitting from the paging controller to the at least one of the plurality of base stations an idle mode information response message if the idle mode information request message comprises information pertaining to a medium access controller (MAC) hash skip threshold.

The method may also preferably comprise receiving in the paging controller the idle mode information request message from the serving base station and transmitting from the paging controller to the serving base station an idle mode information response message. The idle mode information response message may also preferably be transmitted to the at least one of the plurality of base stations and may preferably comprise information to notify the at least one of the plurality of base stations that the mobile station has terminated the idle mode. The method may also preferably comprise transmitting from the serving base station to the mobile station an idle mode command message in response to the idle mode information response message.

The foregoing and other objects, features, aspects and advantages of the present invention will become more apparent from the following detailed description of the present invention when taken in conjunction with the accompanying drawings. It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

The present invention may be used in the context of the IEEE802 broadband wireless access system standard. Alternatively, the present invention may be used in the context of any type of wireless access system.

Figure 1:
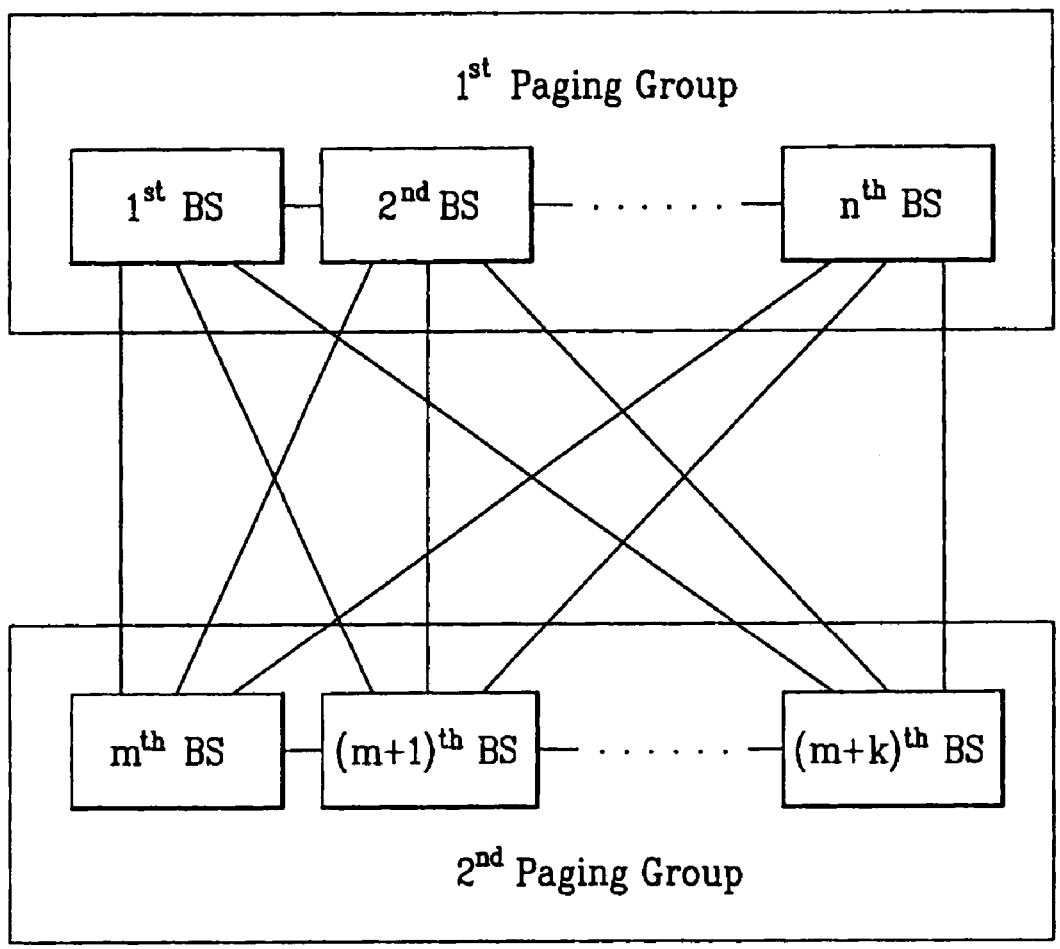
FIG. 1 is a block diagram illustrating a paging group, according to an embodiment of the present invention.

FIG. 1 is a block diagram illustrating a paging group, according to an embodiment of the present invention.

Referring to FIG. 1, a paging group includes at least one base station (BS). The BS or BSs each belonging to a same paging group may transmit and/or receive information needed for idle mode in a mobile station (MS) via backbone messages. A mobile station is also known as a mobile subscriber station (MSS). Alternatively, information needed for idle mode in an MS may be transmitted and/or received between BSs belonging to different paging groups via backbone messages.

Figure 2:
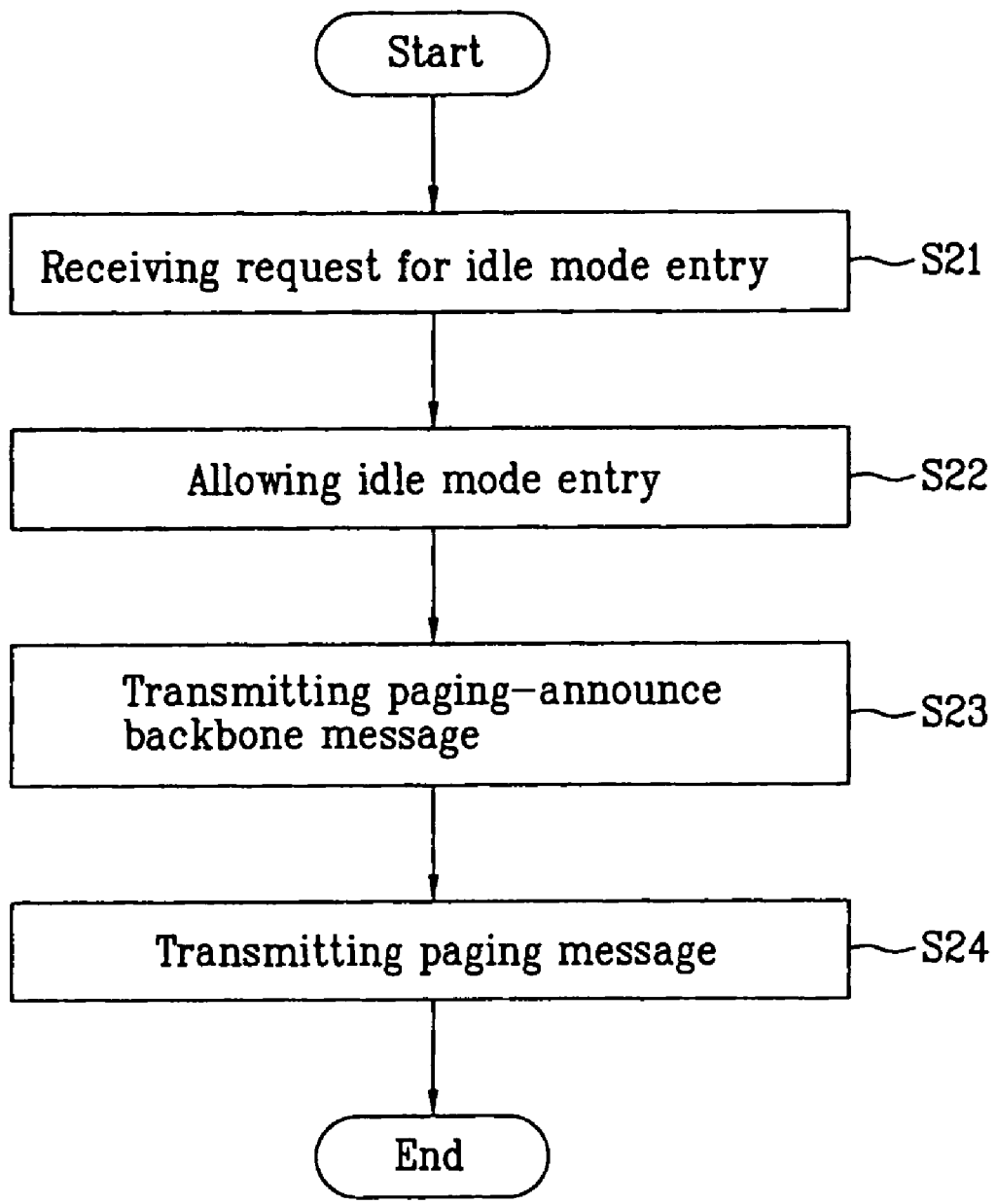
FIG. 2 is a flow diagram illustrating an idle mode procedure, according to an embodiment of the present invention.

FIG. 2 is a flow diagram illustrating an idle mode procedure, according to an embodiment of the present invention.

Referring to FIG. 2, to allow an MSS to enter an idle mode, a switching to the idle mode may preferably be requested to a base station using a registration request message, such as for example, a DREG_REQ message as a medium access controller (MAC) message (S21). An exemplary format of the DREG_REQ message is shown in Table 2.

The MSS may preferably request to a base station that the MSS enter the idle mode by setting a De-registration Request Code of the DREG_REQ message to 0x01, for example. The MSS may then by deliver the DREG_REQ message to the base station.

The base station that receives the DREG_REQ message (receiving base station) may preferably respond to the request of the MSS via a command message, such as for example, a DREG_CMD message (S22). An exemplary format of the DREG_CMD message is shown in Table 3.

The receiving base station may preferably allow the MSS to enter the idle mode via an action code (e.g., Action code=0x05). Alternatively, the receiving base station may preferably allow the MSS to request entering the idle mode after a specified time duration via another action code (e.g., Action code=0x06). Alternatively, the receiving base station may not allow the MSS to request entering the idle mode until the receiving base station transmits the DREG_CMD message via another action code (e.g., Action code=0x07).

Exemplary details of action codes pertaining to the DREG_CMD message are shown in Table 4.

In one embodiment, base stations belonging to the same paging zone may preferably be able to share information pertaining to MSSs that have entered the idle mode. Using this information, the bases stations may preferably notify the MSSs of what procedures the MSSs need to execute in each paging cycle. In order to share information among the BSs, a backbone message, such as for example, a paging-announce backbone message as shown in Table 5 may be used. The paging-announce backbone message may preferably be delivered to all base stations belonging to the same paging zone (S23).

In another embodiment, an action code may be added to the paging-announce backbone message for use in instructing MSSs of necessary actions to be performed while in the idle mode. Thus, as in the example of Table 7 below, the 'Num MSS', the 'MSS MAC address', the 'PAGING CYCLE' and, the 'PAGING OFFSET, as well as other fields of the paging-announce backbone message, may be altered as compared to those in Table 5 above. An exemplary paging-announce backbone message with an added action code for instructing the MSSs is shown in Table 7 below.

TABLE 7

| | | |
|---|---|---|
| Num MSS | 8 bits | Number of MSSs needing an action |
| For(j=0; j<Num MSS; j++){ | | |
| MSS MAC address | 48 bits | |
| Action Code | 3 bits | 0 = Add the MSS to paging list<br>1 = Remove the MSS from paging list<br>2 = Perform ranging to establish location and acknowledgement message<br>3 = Enter Network<br>4 = Reserved |
| | 5 bits | Reserved |
| } | | |

In yet another embodiment, the 'PAGING_CYCLE (16 bits)' and 'PAGING_OFFSET (8 bits)' fields may be removed from the paging-announce backbone message, as shown in Table 7 above, because each of the base stations belonging to the same paging zone possess the same paging cycle and paging offset. Thus, instead of paging cycle and paging offset fields, an action code (e.g., 3-bit action code) may be added to the paging-announce backbone message to indicate that a MAC address associated with a specific MSS has been added to the paging list via an action code (e.g., Action Code=0). Alternatively, the action code may indicate that a MAC address of a specific MSS has been removed from the paging list via another action code (e.g., Action Code=1). Alternatively, the action code may indicate that ranging has been performed for a location information update (e.g., Action Code=2). Alternatively, the action code may indicate that a re-registration procedure to a network has been executed after terminating the idle mode (e.g., Action Code=3).

An exemplary format of a paging message, such as a MOB_PAG_ADV message, transmitted to the MSSs in the idle mode from each of the base stations via paging is shown in Table 6. The paging message may preferably be transmitted to the MSSs in a broadcast format.

The MSS may receive the paging message and determine (decide) whether to maintain the idle mode continuously using an action code (e.g., Action Code=00), whether to perform ranging to establish a location information update (e.g., Action Code=01), and/or whether to terminate the idle mode to receive downlink traffic (e.g., Action Code=10).

A serving base station may preferably allow a specific MSS to enter an idle mode and set an action code of the paging-announce backbone message to 0, for example, and then transmit the paging-announce backbone message to all base stations in the paging zone of the serving base station (S23). Each of the base stations in the paging zone may receive the paging-announce backbone message and may store the MAC address of the corresponding MSS in a paging list. The base stations may then transmit the MAC address via the paging message MOB-PAG_ADV in each paging cycle (S24).

The MSS may receive the paging message and may preferably determine to maintain the idle mode. In so doing, radio resources may be conserved by including the MAC address of the MSS that needs a specific action such as a re-registration to a network or a ranging for a location information update in the paging message. To include the MAC address, the 'MSS MAC Address hash' and 'Action Code' fields of the paging message MOB-PAG_ADV in Table 6 may preferably be changed to match those in Table 8, for example.

TABLE 8

| For (j=0; j<Num_MACs; j++){ | | |
|---|---|---|
| MSS MAC address hash | 24 bits | |
| Action Code | 2 bits | 00 = Enter Network |
| | | 01 = Perform Ranging to establish location and acknowledgement message |
| | | 10-11 = reserved |

If an MSS is forced to terminate the idle mode because of an occurrence of downlink traffic, a respective base station may be unaware that the corresponding MSS belongs to a domain within the paging zone of the respective base station. The respective base station may therefore set the action code of the paging-announce backbone message to 3, for example, and then transfers the paging-announce backbone message to other base stations in the same paging zone.

The other base stations in the paging zone of the respective base station may receive the paging-announce backbone message and set the action code of the paging message to 00, for example. The other base stations may then transmit the paging message to all MSSs in the paging zone to enable the corresponding MSS to terminate the idle mode and to execute the procedure for the re-registration to the network.

After the MSS has normally terminated its idle mode, the respective base station may set the action code of the paging-announce backbone message to 1, for example, and may then deliver the paging-announce backbone message to the other base stations in the paging zone. Therefore, paging for the corresponding MSS may preferably be stopped.

Figure 3:
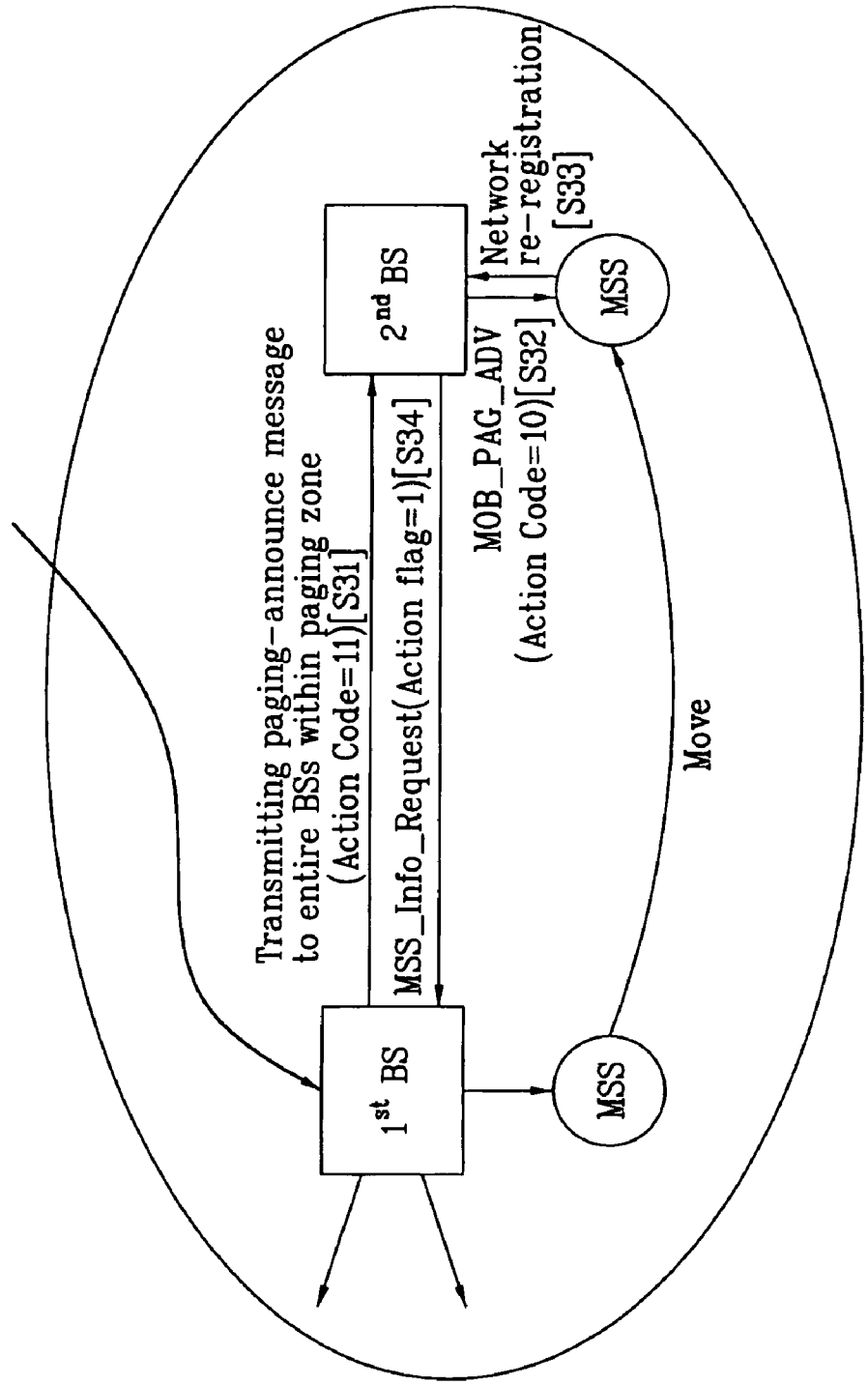
FIG. 3 is a diagram illustrating a procedure for terminating an idle mode when downlink traffic is to be transferred to a mobile station, according to an embodiment of the present invention.

FIG. 3 is a diagram illustrating a procedure for terminating an idle mode when downlink traffic is to be transferred to a mobile station, according to an embodiment of the present invention.

Referring to FIG. 3, because a base station may be unaware of the domain to which an MSS in an idle mode belongs, a downlink traffic may preferably be unconditionally delivered to the base station (first base station or initial base station) to which the MSS initially requested a switching to the idle mode.

After the MSS allowed to enter the idle mode by the first base station receives the downlink traffic, the first base station may set an action code, pertaining to all base stations in the paging zone of the first base station, to 11, for example. The first base station may then transmit a paging-announce backbone message (S31).

Each of the base stations in the paging zone of the first base station may receive the paging-announce message and set an action code of the paging message MOV_PAG_ADV to 10, for example. The base stations may then transmit the paging message to all MSSs in the paging zone in a broadcast format (S32).

The corresponding MSS may receive the paging message and terminate the idle mode. The MSS may also request a second base station (current base station) that is in charge of the paging zone to which the MSS belongs, for a re-registration to a network (S33). The second base station may preferably be made aware of a base station ID of the first base station via the paging-announce message.

The second base station may receive the re-registration request and set an action flag of an MSS_Info_Request backbone message to 1, for example. The MSS_Info_Request backbone message may preferably be transferred between base stations by wire. The second base station may then transmit the MSS_Info_Request backbone message to the first base station to notify the first base station that the MSS has left the paging zone (S34). An exemplary format of the MSS_Info_Request backbone message is shown in Table 9.

TABLE 9

| Field | Size | Notes |
|---|---|---|
| Global Header | 152 bits | |
| For (j=0; j<Num Records; j++){ | | |
| MSS unique identifier | 48 bits | 48-bit unique identifier used by MSS (as provided by the MSS or by the I-am-host-of message) |
| Action flag | 8 bits | 0 - Request information |
| | | 1 - MSS arrived from Idle mode |
| | | 2 - MSS has transitioned to another paging group |
| } | | |
| Security field | TBD | A means to authenticate this message |

The first base station may receive the MSS_Info_Request backbone message and may notify all base stations within the paging zone of the first base station that the MSS has terminated the idle mode and is to be deleted from paging lists of the respective base stations.

The first base station may preferably transmit the traffic of the MSS via a data delivery message having a format shown in Table 10, for example.

TABLE 10

| Field | Size | Notes |
|---|---|---|
| Global Header | 152 bits | |
| Length | 8 bits | The length in bytes of the MAC SDU including the Global Header, MSS unique identifier, and Security field |
| MSS unique identifier | 48 bits | 48-bit unique identifier used by MSS on initial network entry |
| MAC SDU | variable | Received data |
| Security field | TBD | A means to authenticate this message |

Except when the MSS is forced to terminate its idle mode due to downlink traffic, if the idle mode of the MSS needs to be terminated, the MSS may preferably perform an idle mode terminating procedure no later than the first base station requests termination of the idle mode to the MSS via paging.

When the base station receives the request of re-registration to the network from the MSS after completion of terminating the idle mode of the MSS, the BS may set the action code of the paging-announce backbone message to 1, for example. The base station may then transfer the paging-announce backbone message to all base stations belonging to the paging zone of the corresponding base station so that the corresponding MSS may be removed from the respective paging lists.

Figure 4:
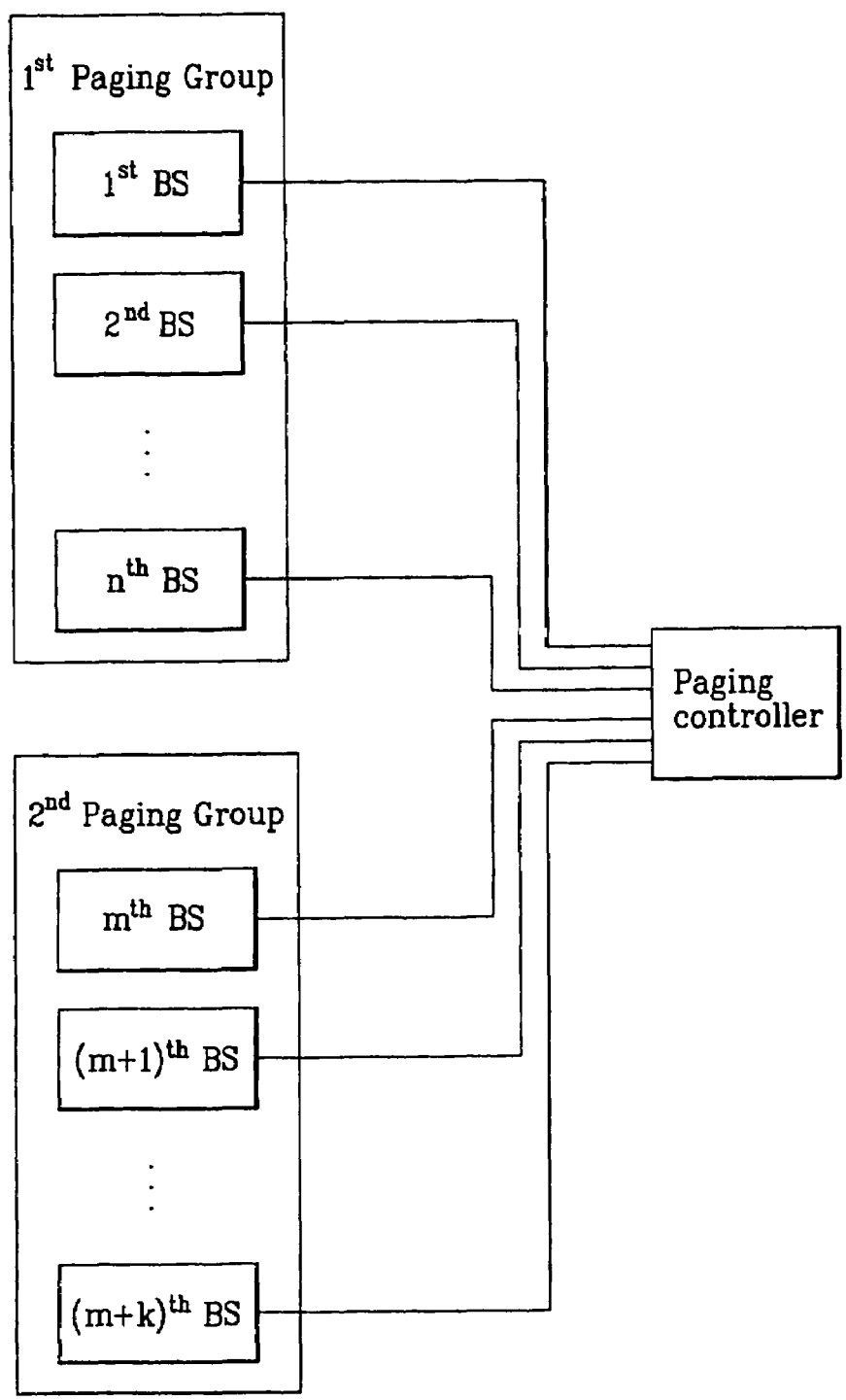
FIG. 4 is a block diagram illustrating a wireless access system having a paging controller according to an embodiment of the present invention.

FIG. 4 is a block diagram illustrating a wireless access system having a paging controller, according to an embodiment of the present invention.

Referring to FIG. 4, a paging controller performs an idle mode control for an MSS in base stations of one or more paging groups by transmitting and/or receiving information necessary for an idle mode support to and/or from the base stations. That is, transmission and/or reception of the information necessary for an idle mode offer may be performed between the base stations via the paging controller. The paging controller may be provided in a specific base station or may be provided separate from the base station.

Figure 5:
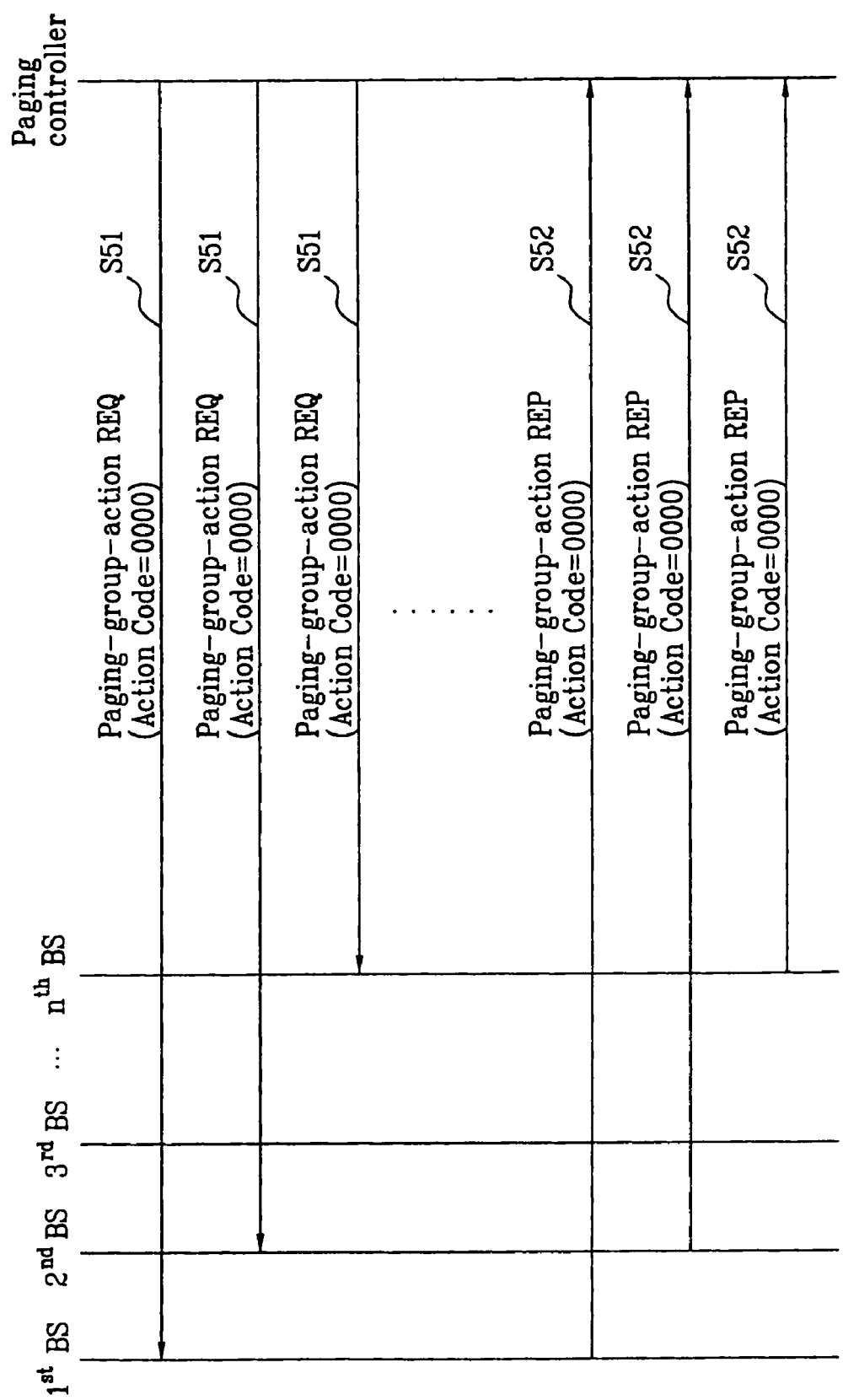
FIG. 5 is a diagram illustrating a procedure for managing base stations within a paging group using a paging controller, according to an embodiment of the present invention.

FIG. 5 is a diagram illustrating a procedure for managing base stations within a paging group using a paging controller, according to an embodiment of the present invention.

Referring to FIG. 5, the paging controller may control base stations belonging to each paging group using a backbone message. For example, using an action code of a paging-request group action request backbone message, the paging controller may assign a base station to a paging group (e.g., Action Code=0000), remove a base station from a specific paging group (e.g., Action code=0001), request paging information of a corresponding base station (e.g., Action Code=0010), or inform paging information of another base station (e.g., Action Code=0011)(S51). An exemplary paging-group-action request message is shown in Table 11.

TABLE 11

| Field | Size | Notes |
|---|---|---|
| Message Type= | 8 bits | |
| Sender ID | 48 bits | Identifier of Paging Controller or BS sending this message |
| Receiver ID | 48 bits | Identifier of Base Station receiving this message |
| Time Stamp | 32 bits | |

TABLE 11-continued

| Field | Size | Notes |
|---|---|---|
| Action code | 4 bits | 0000: Assign Target BS to Paging Groups<br>0001: Remove Target BS from Paging Groups<br>0010: Query (Paging Information of Receiver BS)<br>0011: Information (Paging Information of Queried BS)<br>0100-1111: reserved |
| If (Action Code=0000 or 0001) { | | |
| Num Records | 4 bits | Number of paging group IDs associated with receiver |
| For (i=0; j<Num Records; i++) { | | |
| Paging Information | 32 bits | 0-7: Paging Group ID,<br>8-23: Paging Cycle,<br>24-31: Paging Offset |
| } } Else If (Action Code=0010) { | | |
| Reserved | 4 bits | Shall be set to zero |
| } Else If (Action code=0011) { | | |
| Num BSs | 4 bits | Num of BSs queried |
| For (j=0; j<Num BSs; j++) { | | |
| Queried BS ID | 48 bits | Identifier of Base Station of which Paging Information is included |
| Num Records | 4 bits | Number of Paging Group IDs associated with Queried BS |
| For (k=0; k<Num Records; k++) { | | |
| Paging Information | 32 bits | 0-7: Paging group ID,<br>8-23: Paging Cycle,<br>24-31: Paging Offset |
| } } } | | |
| Security field | TBD | A means to authenticate this message |

A base station receiving a paging-group-action request message may preferably transmit information necessary for an idle mode using action codes of a paging-group-action response message. The paging-group-action response message may be transferred to the paging controller by the base station that received the paging-group-action request message (S52). For example, the base station may transmit a response to the paging-group-action request message to add the BS to or remove the BS from the paging group (e.g., Action Code=0000). The paging-group-action response message may also be transmitted in order to offer its paging information (e.g., Action code=0001), or to query paging information from another base station (e.g., Action Code=0010). An exemplary paging-group-action response message is shown in Table 12.

TABLE 12

| Field | Size | Notes |
|---|---|---|
| Message Type= | 8 bits | |
| Sender ID | 48 bits | Identifier of Base Station sending this message |
| Receiver ID | 48 bits | Identifier of Paging Controller receiving this message |

TABLE 12-continued

| Field | Size | Notes |
|---|---|---|
| Time Stamp | 32 bits | |
| Action code | 4 bits | 0000: confirm the assignment to or removal from paging groups<br>0001: Information (Paging Information of Sender BS)<br>0010: Query (Paging Information of another BS)<br>0100-1111: reserved |
| If (Action Code=0000) {<br>Reserved<br>}<br>Else If (Action Code=0001) { | 4 bits | Shall be set to zero |
| Num Records | 4 bits | Number of Paging Group IDs associated with Sender BS |
| For (i=0; j<Num Records; i++) {<br>Paging Information | 32 bits | 0-7: Paging Group ID,<br>8-23: Paging Cycle,<br>24-31: Paging Offset |
| }<br>}<br>Else If (Action Code=0010) {<br>Num BSs | 4 bits | Number of BSs of which Paging Information Sender BS wants to know |
| For (j=0; j<Num BSs; j++) {<br>Queried BS ID | 48 bits | Identifier of Base Station of which Paging Information is included |
| }<br>}<br>Security field | TBD | A means to authenticate this message |

Figure 6:
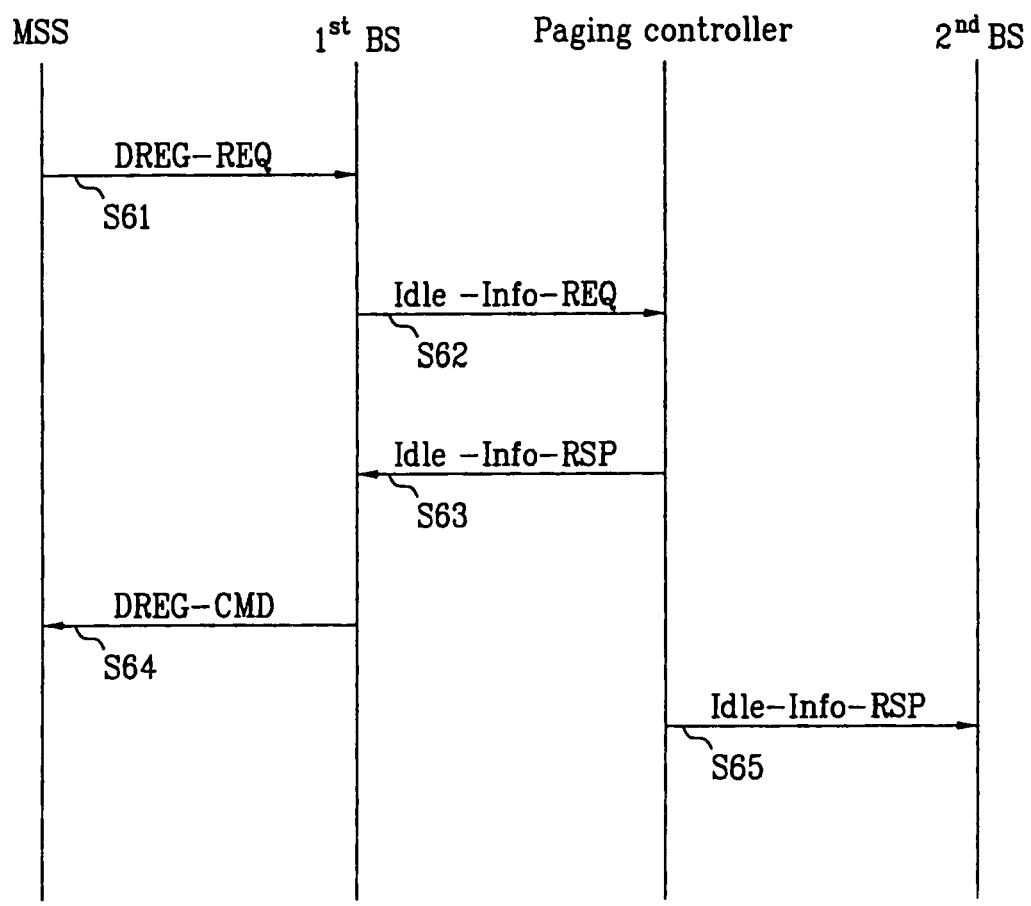
FIG. 6 is a diagram illustrating an idle mode initiation procedure in a wireless access system having a paging controller, according to an embodiment of the present invention.

FIG. 6 is a diagram illustrating an idle mode initiation procedure in a wireless access system having a paging controller, according to an embodiment of the present invention.

Referring to FIG. 6, when an MSS intends to enter an idle mode, the MSS may transmit an idle mode entry request (e.g., DREG-REQ) message to a BS to which the MSS belongs to request an idle mode entry (S61). The DREG-REQ message may include information pertaining to a request for de-registration from the BS to which the MSS belongs (e.g., de-registration request code) and TLV encoded information (e.g., Paging Cycle Request TLV, Idle Mode Retain Information TLV, MAC Hash Skip Threshold TLV).

The serving BS may receive the idle mode entry request message and transmit an idle mode information request (e.g., Idle-Info_REQ) message to provide information pertaining to the MSS requesting the idle mode entry to the paging controller (S62). Table 13 shows an exemplary idle mode information request message.

TABLE 13

| Field | Size | Notes |
|---|---|---|
| Idle-Info-REQ message format( ){<br>Global Message Header | 12 bits | |
| For(i=0; i<Num Records; i++){<br>MSS MAC Address | 48 bits | |
| Action Code | 4 bits | 0000: Idle Mode Initiation Request<br>0001: DL Traffic has arrived to MSS<br>0010: MSS session information<br>0011: MSS re-entry complete |

TABLE 13-continued

| | | 0100: MSS has transitioned to another paging group<br>0101-1111: reserved |
|---|---|---|
| Reserved | 4 bits | |
| TLV encoded information | Variable | |
| Num_SFID_Records | 8 bits | |
| For(i=1; i<Num_SFID_Records; i++){ | | |
| SFID | 32 bits | |
| Num_QoS_Records | 8 bits | |
| For(i=1; i<Num_QoS_Records; i++) | | |
| TLV encoded information | variable | 11.13 Service flow management encodings |
| }<br>}<br>}<br>Security Field | TBD | A means to authenticate this message |
| } | | |

| Name | Type | Length | Value |
|---|---|---|---|
| Paging Information | | 4 | 0-7: Paging Group ID<br>8-23: Paging Cycle<br>24-31: Paging Offset |
| Paging Controller ID | | 6 | Logical network identifier for the serving BS or other network entity retaining MSS Service and operational information and/or administering paging activity for the MSS while in Idle Mode. |
| Idle Mode Retain Information | | variable | The first 8 bits of this item indicates Idle Mode Retain Information included in DREG-CMD message, and the rests are MSS service and operational information associated with Idle Mode Retain Information. This item may be included in Idle-Info-REQ message with Action Code=0000. |
| MAC Hash Skip Threshold | | 1 | Maximum number that BS is allowed to skip MSS MAC address hash of an MSS in successive MOB_PAG-ADV messages when an Action Code for the MSS is 00, 'No Action Required'. The unit is the number of MOB_PAG-ADV message transmissions. |
| HO Optimization flag | | 1 | This item may be included in Idle-Info-REQ message with Action Code=0011. |

Referring to Table 13, the idle mode information request message may preferably include information that a specific MSS has requested an idle mode entry, a MSS MAC address, MSS service flow information, and TLV encoded information (e.g., Idle Mode Retain Information TLV, MAC Hash Skip Threshold TLV).

The paging controller may receive the idle mode information request message and transmit an idle mode information response (e.g., Idle-Info-RSP) message to the BS that transmitted the idle mode information request message (S63). If the idle mode information request message transmitted from the serving BS includes information pertaining to the MAC Hash Skip Threshold, the paging controller may preferably transmit the idle mode information response message to all BSs belonging to the paging group (S65).

Table 14 shows an exemplary idle mode information response (Idle-Info-RSP) message.

TABLE 14

| Field | Size | Notes |
|---|---|---|
| Idle-Info-RSP message format( ){ | | |
| Global Message Header | 152 bits | |
| For(i=0; I<Num Records; i++){ | | |
| MSS MAC Address | 48 bits | |
| Action Code | 4 bits | 0000: MSS enters Idle Mode<br>0001: MSS exits Idle Mode<br>0010: MSS session information<br>0011: Deliver DL Traffic to Current Attachment BS<br>0100-1111: reserved |
| reserved | 4 bits | |
| TLV encoded information | Variable | |
| For(i=1; i<Num_SFID_Records; I++){ | | |
| SFID | 32 bits | |
| Num_QoS_Records | 8 bits | |
| For(i=1; I<Num_QoS_Records; i++) | | |
| TLV encoded information | variable | 11.13 Service flow management encodings |
| } | | |
| } | | |
| } | | |
| Security Field | TBD | A means to authenticate this message |
| } | | |

| Name | Type | Length | Value |
|---|---|---|---|
| Paging Information | | 4 | 0-7: Paging Group ID<br>8-23: Paging Cycle<br>24-31: Paging Offset |
| Paging Controller ID | | 6 | Logical network identifier for the serving BS or other network entity retaining MSS Service and operational information and/or administering paging activity for the MSS while in Idle Mode. |
| Idle Mode Retain Information | | 1 | The first 8 bits of this item indicates Idle Mode Retain Information included in DREG-CMD message, and the rests are MSS service and operational information associated with Idle Mode Retain Information. This item may be included in Paging-announce message with Action Code=0011. |
| Current Attachment BS ID | | 6 | BS ID to which MSS in Idle Mode attempts to re-enter network. This item may be included in Idle-Info-RSP message if Action Code is 0011. |
| Last Attachment BS ID | | 6 | BS ID in which MSS enters Idle Mode. Last Attachment BS may be updated after successful Location Update. This item may be included in Idle-Info-RSP message if Action Code is 0010. |
| MAC Hash Skip Threshold | | 1 | Maximum number that BS is allowed to skip MSS MAC address hash of an MSS in successive MOB_PAG-ADV messages when an Action Code for the MSS is 00, 'No Action Required'. The unit is the number of MOB_PAG-ADV message transmissions. |
| HO Optimization flag | | 1 | This item may be included in Idle-Info-RSP message with Action Code=0011. 'MSS re-entry complete'. |

Referring to Table 14, the idle mode information response (Idle-Info-RSP) message may preferably include information that the MSS has entered an idle mode, a MSS MAC address, MSS service flow information, and TLV encoded information (e.g., Paging Information TLV, Paging controller ID TLV, Idle Mode Retain Information TLV, MAC Hash Skip Threshold TLV).

The BS may receive the idle mode information response (Idle-Info-RSP) message and may transmit an idle mode command (e.g., DREG-CMD) message to the MSS that requested the idle mode entry (S64). The idle mode command message may preferably include information pertaining to commanding the idle mode entry, as well as TLV encoded information (e.g., Paging Information TLV, Paging controller ID TLV, Idle Mode Retain Information TLV, MAC Hash Skip Threshold TLV).

Figure 7:
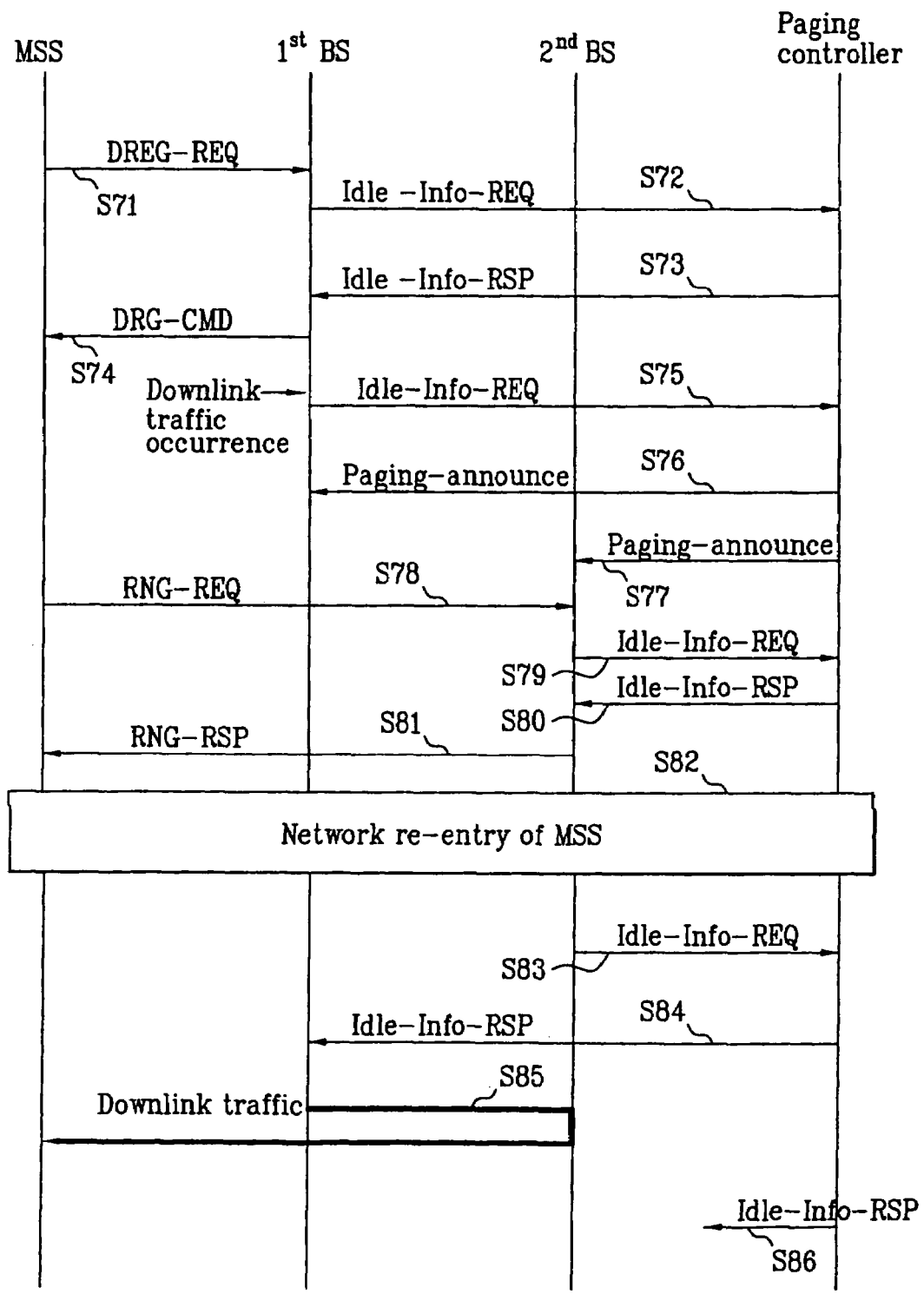
FIG. 7 is a flow diagram illustrating a traffic occurrence in an idle mode mobile station, in a wireless access system having a paging controller, according to an embodiment of the present invention.

FIG. 7 is a flow diagram illustrating a traffic occurrence in an idle mode mobile station, in a wireless access system having a paging controller, according to an embodiment of the present invention.

Referring to FIG. 7, an MSS may enter an idle mode (S71~S74). The MSS in the idle mode may stay in a BS area where the idle mode entry was performed or may move away into another BS area. An exemplary case in which the MSS in the idle mode moves to a second BS area is described below.

If downlink traffic occurs in the idle mode, a first BS to which the MSS belonged when entering the idle mode, may transmit information that downlink traffic has occurred in the idle-mode MSS to a paging controller (S75). The paging controller may transmit a paging-announce message to notify all BSs in the respective paging zone that the idle-mode MSS has terminated the idle mode to re-enter a network (S76, S77). The BSs may then broadcast a paging advertisement message (e.g., MPB-PAG-ADV). An exemplary paging advertisement message is shown in Table 6.

Table 15 shows an exemplary paging-announce message.

TABLE 15

| Field | Size | Notes |
|---|---|---|
| Paging-announce message format( ) | | |
| Global Message Header | 152 bits | |
| For(i=0; i<Num Records; i++){ | | |
| MSS MAC address | 48 bits | |
| Action Code | 4 bits | 0000: MSS shall be paged to re-enter network<br>0001: MSS shall be paged to perform ranging<br>0010-1111: reserved |
| Reserved | 4 bits | |
| } | | |
| Security Field | TBD | A means to authenticate this message |
| } | | |

While in the idle mode, in this example, the MSS has moved to an area of a second BS. The MSS may recognize that downlink traffic is present via a paging advertisement message (e.g., MOB_PAG-ADV) periodically broadcasted to the paging zone. The MSS may then transmit a ranging request message for network re-entry to the second BS (S78). The second BS may request MSS session information, pertaining to time prior to the idle mode entry, from the paging controller using an idle mode information request message (S79). The paging controller may preferably transmit an idle mode information response message, including MSS session information and information pertaining to the BS where the MSS was located when entering the idle mode, to the second BS (S80).

The second BS may transmit a ranging response message including a handover optimization flag to the MSS based on the MSS session information and idle mode retain information transmitted from the paging controller (S81). Once the MSS performs a network re-entry procedure (S82), the second BS in charge of the area where the MSS is currently located may notify the paging controller that the MSS has re-entered the network via the idle mode information request message (S83). In so doing, the second BS may include the handover optimization flag (which is included in the ranging response message) in the idle mode information request message.

The paging controller may preferably recognize that the MSS has re-entered the network in a current second BS area after completion of the idle mode entry in the first BS. The paging controller may then command (instruct) that the traffic delivered to the first BS be transmitted to the MSS via the second BS using the idle mode information response message (S84).

The first BS may deliver the traffic to the second BS according to the command (instruction) of the paging controller. The second BS may then transmit the traffic to the MSS (S85). The paging controller may then notify all BSs belonging to the paging group that the MSS has terminated the idle mode, using the idle mode information response message (S86). Each of the BSs may receive the idle mode information response message from the paging controller and remove the MAC address of the MSS from their respective idle mode MSS lists.

In one embodiment, if downlink traffic to be transferred to the MSS in the idle mode is transferred via the paging controller, the steps S75 and/or S84 may be omitted.

In another embodiment, a method of supporting a mobile station that is in an idle mode in a wireless communication system using a paging controller comprises entering an idle mode by a mobile station. The method also comprises receiving a paging command from at least one of the plurality of base stations in the same paging group, the paging command comprising a paging command action code associated with performing ranging while the mobile station is in the idle mode to verify availability of the mobile station with respect to at least one of the base stations in the paging group, wherein the paging command is generated from the at least one of the plurality of base stations in response to a paging announcement from the paging controller. The method also comprises exiting the idle mode and establishing communication with one of the plurality of base stations, wherein the plurality of base stations in the same paging group receive mode exist status from the paging controller.

The paging announcement may preferably be generated from the paging controller when there is downlink traffic data to be delivered to the mobile station. Alternatively, the paging announcement may preferably be generated from the paging controller when there is uplink traffic data from the mobile station. The idle mode response command may preferably comprise at least one of the paging identifier, a paging cycle and a paging cycle offset. The step of exiting the idle mode and establishing communication may preferably further comprise transmitting a ranging request to one of the plurality of base stations with which the mobile station is associated and receiving a ranging response from the one of the plurality of base stations.

The paging announcement may preferably comprise a paging announcement action code comprising at least one of (1) add the mobile station to a paging list; (2) remove the mobile station from the paging list; (3) perform ranging to establish location; and (4) enter network. The paging command action code may preferably comprise at least one of (1) enter network; and (2) perform ranging to establish location.

The step of entering the idle mode may preferably further comprise requesting to a serving base station by a mobile station to enter an idle mode, wherein the serving base station is associated with a paging controller, the paging controller controlling a plurality of base stations associated with a paging group. The step of entering the idle mode may also preferably further comprise receiving from the serving base station an idle mode response command to enter the idle mode.

The paging controller may preferably be identified with a paging controller identifier and the mobile station is identified with a medium access controller (MAC) identifier. The paging command may preferably comprise information identifying the mobile station by using the MAC identifier. The paging announcement may preferably comprise information identifying the mobile station by using the MAC identifier. The step of entering the idle mode by the mobile station may preferably further comprise the paging controller informing an idle mode entering status of the mobile station to the plurality of base stations in the paging group.

In yet another embodiment, a method of supporting an idle mode by a network in a wireless communication system using a paging controller comprises receiving a request from a mobile station to a serving base station to enter an idle mode, wherein the serving base station is associated with a paging controller, the paging controller controlling a plurality of base stations associated with a paging group. The method also comprises transmitting from the serving base station to the mobile station an idle mode response command to enter the idle mode. The method also comprises transmitting a paging command from at least one of the plurality of base stations in the same paging group, the paging command comprising a paging command action code associated with performing ranging while the mobile station is in the idle mode to verify availability of the mobile station with respect to at least one of the base stations in the paging group, wherein the paging command is generated from the at least one of the plurality of base stations in response to a paging announcement from the paging controller. The method also comprises establishing communication between one of the plurality of base stations and the mobile station. The method also comprises transmitting an idle mode exist status from the paging controller to the plurality of base stations in the same paging group.

The method may also preferably comprise transmitting from the serving base station to the paging controller an idle mode information request message to provide information pertaining to the mobile station. The method may also preferably comprise receiving in the paging controller the idle mode information request message from the serving base station. The method may also preferably comprise transmitting from the paging controller to the at least one of the plurality of base stations an idle mode information response message if the idle mode information request message comprises information pertaining to a medium access controller (MAC) hash skip threshold.

The method may also preferably comprise receiving in the paging controller the idle mode information request message from the serving base station and transmitting from the paging controller to the serving base station an idle mode information response message. The idle mode information response message may also preferably be transmitted to the at least one of the plurality of base stations and may preferably comprise information to notify the at least one of the plurality of base stations that the mobile station has terminated the idle mode. The method may also preferably comprise transmitting from the serving base station to the mobile station an idle mode command message in response to the idle mode information response message.

Accordingly, in the present invention, each base station may include operations of an MSS in the idle mode in a paging-announce backbone message. The paging-announce backbone message may be delivered by wire between the base stations via paging. Therefore, the present invention may reduce a size of the paging message (e.g., MOB-PAG_ADV) that the MSS delivers to the MSS in the idle mode. Moreover, in a wireless access system having a paging controller, the present invention may efficiently support the idle mode using the paging controller.

It will be apparent to those skilled in the art that various modifications and variations may be made in the present invention without departing from the spirit or scope of the inventions. Thus, it is intended that the present invention covers the modifications and variations of this invention provided they come within the scope of the appended claims and their equivalents.

What is claimed is:

1. A method of supporting a mobile station that is in an idle mode in a wireless communication system using a paging controller, the method comprising:

receiving from a first base station an idle mode response command to enter the idle mode;

entering an idle mode by a mobile station;

receiving a paging command from at least one of the plurality of base stations in a paging group, the paging command comprising a paging command action code associated with performing ranging while the mobile station is in the idle mode, wherein the paging command is generated from the at least one of the plurality of base stations in response to a paging announcement, wherein the paging announcement comprises a paging announcement action code set by the paging controller to instruct the mobile station to perform network re-entry when there is downlink traffic data to be delivered to the mobile station, and wherein the paging command action code is determined in accordance with the paging announcement action code; and terminating the idle mode;

transmitting a ranging request message for network re-entry to a second base station in the paging group, when the paging command action code indicates that the mobile terminal shall enter the network;

receiving a raging response message from the second base station; and receiving downlink traffic data from the second base station, wherein the downlink traffic data have been delivered from the first base station to the second base station according to an instruction of the paging controller.

2. The method of claim 1, wherein the idle mode response command comprises at least one of the paging identifier, a paging cycle and a paging cycle offset.

3. The method of claim 1, wherein the step of entering the idle mode further comprises:

requesting to a serving base station by a mobile station to enter an idle mode, wherein the serving base station is associated with a paging controller, the paging controller controlling a plurality of base stations associated with a paging group; and receiving from the serving base station an idle mode response command to enter the idle mode.

4. The method of claim 1, wherein the paging controller is identified with a paging controller identifier and the mobile station is identified with a medium access controller (MAC) identifier.

5. The method of claim 4, wherein the paging command comprises information identifying the mobile station by using the MAC identifier.

6. The method of claim 4, wherein the paging announcement comprises information identifying the mobile station by using the MAC identifier.

7. A method of supporting an idle mode by a network in a wireless communication system using a paging controller, the method comprising:

receiving, by a first base station, a request from a mobile station to enter an idle mode, wherein the first base station is associated with a paging controller, the paging controller controlling a plurality of base stations associated with a paging group;

transmitting, from the first base station, an idle mode response command to the mobile station to permit the idle mode;

receiving, by the first base station, a paging announcement from the paging controller, the paging announcement generated by the paging controller to instruct the mobile station to perform network re-entry when there is downlink traffic data to be delivered to the mobile station, wherein the paging announcement comprises a paging announcement action code;

transmitting, from the first base station, a paging command to the mobile station, the paging command comprising a paging command action code associated with performing ranging while the mobile station is in the idle mode, wherein the paging command is generated in response to the paging announcement, and wherein the paging command action code is determined in accordance with the paging announcement action code;

receiving, by a second base station in the paging group, a ranging request message from the mobile station for network re-entry;

transmitting, from the second base station, a raging response message to the mobile station;

transferring, from the first base station, downlink traffic data to the second base station according to an instruction of the paging controller, wherein the downlink traffic data have been delivered to the first base station before the network re-entry of the mobile station; and transmitting, from the second base station, the downlink traffic data to the mobile station.

8. The method of claim 7, wherein the idle mode response command comprises at least one of the paging identifier, a paging cycle and a paging cycle offset.

9. The method of claim 7, further comprising:

transmitting from the first base station to the paging controller an idle mode information request message to provide information pertaining to the mobile station.

10. The method of claim 9, further comprising:

receiving, by the paging controllers, the idle mode information request message from the first base station; and transmitting from the paging controller to the at least one of the plurality of base stations an idle mode information response message if the idle mode information request message comprises information pertaining to a medium access controller (MAC) hash skip threshold.

11. The method of claim 9, further comprising:

receiving, by the paging controllers, the idle mode information request message from the first base station; and transmitting from the paging controller to the first base station an idle mode information response message.

* * * * *